(12) United States Patent
Molnar et al.

(10) Patent No.: US 7,912,433 B2
(45) Date of Patent: Mar. 22, 2011

(54) METHOD AND APPARATUS FOR GENERATING CHANNEL QUALITY INFORMATION FOR WIRELESS COMMUNICATION

(75) Inventors: Karl Molnar, Cary, NC (US); Jung-Fu Cheng, Fremont, CA (US); Stephen J. Grant, Cary, NC (US); Leonid Krasny, Cary, NC (US); Yi-Pin Eric Wang, Fremont, CA (US)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 12/750,793

(22) Filed: Mar. 31, 2010

(65) Prior Publication Data
US 2010/0183064 A1    Jul. 22, 2010

Related U.S. Application Data

(62) Division of application No. 11/438,921, filed on May 23, 2006, now Pat. No. 7,773,951.

(51) Int. Cl.
*H04B 17/00* (2006.01)
(52) U.S. Cl. ............. 455/226.1; 375/224; 375/225
(58) Field of Classification Search .......... None
See application file for complete search history.

(56) References Cited

U.S. PATENT DOCUMENTS

| 7,124,193 | B1 * | 10/2006 | Leung et al. ........ 709/231 |
| 2006/0083195 | A1 * | 4/2006 | Forenza et al. ....... 370/328 |
| 2006/0251180 | A1 * | 11/2006 | Baum et al. ........ 375/260 |

OTHER PUBLICATIONS

Haitao, Z. et al. "Optimizing the ARQ Performance in Downlink Packet Data Systems with Scheduling." IEEE Transactions on Wireless Communications, Mar. 2005, vol. 4, Iss. 2, pp. 495-506.*
Mingzhe, L. et al. "Modeling and Simulating Packet Dispersion in Wireless 802.11 Networks." Technical Report WPI-CS-TR-06-03, Mar. 2006.*

* cited by examiner

*Primary Examiner* — Matthew D Anderson
*Assistant Examiner* — Gennadiy Tsvey
(74) *Attorney, Agent, or Firm* — Coats & Bennett, PLLC

(57) ABSTRACT

A method and apparatus for generating channel quality information, such as may be used for transmit link adaptation, provide different operating modes, such as a first mode that may be used when propagation channel estimates are not reliable, and a second mode that may be used when the propagation channel estimates are reliable. In one or more embodiments, channel quality information is generated using receiver performance information that characterizes receiver performance in terms of a defined channel quality metric, e.g., supported data rates, for different values of receiver input signal quality over a range of propagation channel realizations. Channel quality information can be generated by selecting channel quality metrics according to receiver input signal quality and a desired probability of meeting a defined performance requirement over a range of propagation channel realizations, or by selecting channel quality metrics according to receiver input signal quality and particularized propagation channel realizations.

6 Claims, 6 Drawing Sheets

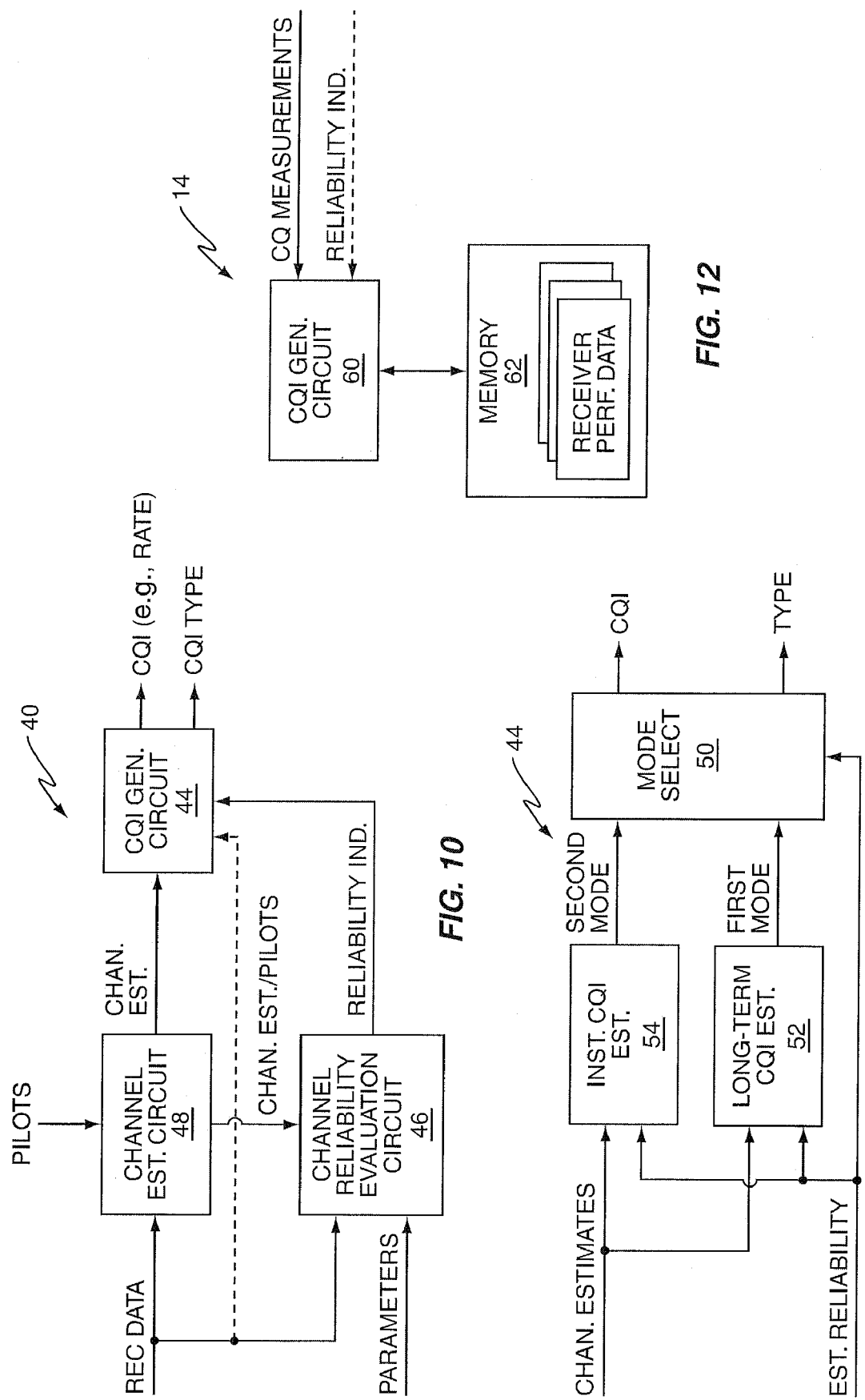

METHOD AND APPARATUS FOR GENERATING CHANNEL QUALITY INFORMATION FOR WIRELESS COMMUNICATION

RELATED APPLICATION

This application is a divisional of U.S. patent application Ser. No. 11/438,921, filed 23 May 2006, and claims priority to that prior non-provisional patent application under 35 U.S.C. §121.

BACKGROUND

The present invention generally relates to generating wireless communications, and particularly relates to generating channel quality information.

Channel quality information can be expressed in a number of ways, such as a channel quality indicator identifying the effective signal quality of a wireless communication receiver. The effective signal quality represents the benefits of any interference cancellation gains, diversity combining gains, coding gains, etc., that may be provided by the receiver. In other words, the output signal quality of a given receiver may be significantly better than the receiver's input signal quality, which generally is expressed as the "raw," uncompensated ratio of received signal energy to background noise and interference.

Those skilled in the wireless communications art will appreciate the value of generating channel quality information based on the output signal quality rather than the input signal quality, because the output signal quality better represents the actual signal quality bearing on the quality of demodulation and decoding performance. That is, assuming that the channel quality information is used for link adaptation, e.g., picking the modulation and coding scheme (MCS) that is appropriate for transmitting to the receiver, using input signal quality rather than output signal quality would result in chronically underutilizing the transmission link.

Accurately determining output signal quality as part of ongoing receiver operations is not, however, a straightforward proposition for some types of receivers. In particular, non-linear receivers generally have a complex relationship between input signal quality and output signal quality. Examples of non-linear receivers include multi-stage receivers employing successive interference cancellation, and joint-detection receivers.

Further, even assuming the calculability of output signal quality, such calculations may be inaccurate under some circumstances. For example, the performance achievable by a given receiver depends on a number of variables, including propagation channel conditions. Some channel conditions translate into better receiver performance than others. Thus, even for the same receiver input signal, the receiver output signal quality will vary as a function of changing channel conditions. If channel conditions are changing rapidly, or the input signal is too weak to make reliable channel estimates, reporting output signal quality, or some metric relating to output signal quality, may lead to control errors.

For example, a supporting base station may perform transmit link adaptation responsive to receiving channel quality information from a wireless communication device, that identifies the quality of the channel in terms of some metric, such as a channel quality indicator, a rate selection indicator, or the like. Thus, the base station can adjust the transmit data rate, for example, in accordance with the channel quality indicators reported by the device. This control mechanism works well if the actual channel conditions change slowly in comparison to the link adaptation control lag. However, performing link adaptation in consideration of actual propagation channel conditions becomes unreliable if those conditions change rapidly in comparison to the link adaptation control timing.

SUMMARY

According to one or more method and apparatus embodiments taught herein, different modes of operation are used for determining channel quality information for a wireless communication device, depending on, for example, the reliability of propagation channel estimates for the wireless communication device. For example, in one embodiment, channel quality information is determined in a first mode by mapping receiver input signal quality to a data rate that can be supported at a desired probability over a range of propagation channel realizations. A supported data rate may be defined as an allowable data rate that can be achieved with a desired performance requirement, e.g., Block Error Rate (BLER). Further, in the second mode, the channel quality information is determined by mapping receiver input signal quality to a data rate that can be supported for a particular propagation channel realization, or that can be supported for a constrained range of propagation channel conditions, corresponding to the current channel estimates obtained by the wireless communication device.

Thus, the first mode provides for generating channel quality information as a function of long-term propagation channel conditions when short-term propagation channel estimates are not reliable, such as where the time lag associated with transmit link adaptation is large compared to the coherent time of propagation channel fading. Conversely, the second mode provides for generating channel quality information as a function of short-term propagation channel conditions when short-term propagation channel estimates are reliable. Modal operation can be driven by determining whether the channel estimates being generated by the wireless communication device are reliable. Reliability may be determined by evaluating the mobility—e.g., rate of movement, Doppler frequency, etc.—of the wireless communication device, or by evaluating the channel estimates.

With the above in mind, in one embodiment, a method of determining channel quality information for a transmit propagation channel associated with a wireless communication device comprises in a first mode, generating channel quality information according to a first algorithm that does not depend on channel estimates, and in a second mode, generating channel quality information according to a second algorithm that depends on channel estimates. Receiver performance data characterizing receiver performance for a type of receiver associated with the wireless communication device may be used to generate the channel quality feedback in the first and second modes, and such generation may be performed by the wireless communication device itself, or by a base station in a supporting wireless communication network.

For example, a wireless communication device or a base station may comprise one or more processing circuits configured to determine channel quality information for one or more signals received by the wireless communication device, based on, in a first mode, generating channel quality information according to a first algorithm that does not depend on channel estimates, and in a second mode, generating channel quality information according to a second algorithm that depends on channel estimates. The processing circuit(s) are, in one or more embodiments, configured to operate selectively in the first or second mode based on whether the channel estimates are reliable.

Complementing the above method of channel quality information generation, one embodiment of a receiver performance characterization method comprises, at each of a number of receiver input signal qualities, computing an error rate expected for each of a number of propagation channel realizations, and, for each of the error rates computed, computing a data rate that can be supported for each propagation channel realization at each receiver input signal quality, and, for each receiver input signal quality, computing the cumulative distribution function (CDF) of the supported data rates corresponding to the propagation channel realizations. Such performance characterization data may be stored by the wireless communication device, or by the supporting wireless communication network. Generally, the performance characterization data is specific for a receiver type, and different data can be stored for different receiver types. For example, a particular type of Generalized RAKE (G-RAKE) or other Minimum Mean Squared Error (MMSE) receiver would have different characterization data than would a particular type of Joint Detection (JD) receiver. Similarly, different performance characterization data can be stored for different transmit/reception modes (MISO, MIMO, etc.), even for the same receiver type.

A corresponding method of providing rate adaptation feedback from a wireless communication device to a supporting wireless communication network operates in a first mode by selecting a supported data rate using the receiver performance data according to a receiver input signal quality corresponding to measurements obtained by the wireless communication device, and a desired probability of achieving the selected data rate for a range of propagation channel realizations. In the second mode, the channel quality information is generated using the receiver performance data by selecting a supported data rate according to receiver input signal quality and a particular propagation channel realization, or a constrained range of the propagation channel realizations, corresponding to channel estimates obtained by the wireless communication device.

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIGS. 10 and 11 are block diagrams of embodiments of processing circuits used in generating channel quality information.

FIG. 12 is a block diagram of one embodiment of a base station that is configured to generate channel quality information based on receiving channel quality measurements for the wireless communication device.

DETAILED DESCRIPTION

Figure 1:
FIG. 1 is a block diagram of a base station and a wireless communication device, such as a mobile station, wherein channel quality information is generated according to one or more method embodiments taught herein.

FIG. 1 illustrates a base station 10 and a wireless communication device 12, wherein the channel quality information generated for the downlink between the base station 10 and the wireless communication device 12 is, in a first mode of operation, not dependent on current propagation channel estimates, and, in a second mode, is dependent on current propagation channel estimates. Thus, the first mode of generating channel quality information may be used where estimates of the downlink propagation channel are not reliable, such as when the wireless communication device 12 is moving at a high rate relative to the base station 10, or is otherwise experiencing fast fading conditions, or when the received signal strength is too low for reliable channel estimation.

Before describing various embodiments of the above method of generating channel quality information, it should be understood that the processing logic associated with generating the channel quality information can be performed wholly in the wireless communication device 12, wholly in the base station 10, or performed cooperatively using both the base station 10 and the wireless communication device 12. In all such cases, the attendant processing may be implemented in hardware, software, or any combination thereof. Moreover, it should be understood that the base station 10 and the wireless communication device 12 are not limited to any particular configuration, nor are they limited to any particular wireless communications standards or protocols.

For example, in one or more embodiments, the wireless communication device 12 comprises a cellular radiotelephone or other type of mobile station, configured for operation with a supporting wireless communication network that includes the base station 10. In such embodiments, the base station 10 may comprise a Wideband CDMA (WCDMA) base station configured to provide High Speed Downlink Packet Access (HSDPA) services.

Correspondingly, the wireless communication device 12 may comprise a WCDMA-based access terminal configured to provide channel quality information, or related feedback, to the base station 10, in support of adapting downlink transmit data rates to changing reception conditions at the wireless communication device 12. In general, however, the wireless communication device 12 may comprise a mobile station or other type of handset, a pager, a Portable Digital Assistant (PDA), a palmtop or laptop computer, or a wireless communication module for use therein, or essentially any other type of communication device.

Figure 2:
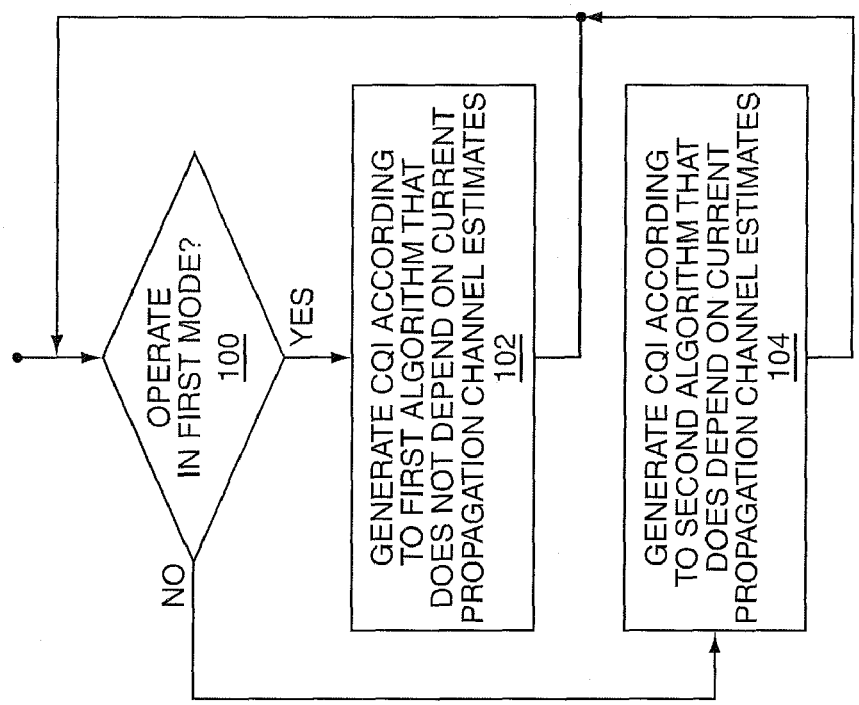
FIG. 2 is a logic flow diagram for one embodiment of processing logic for modal generation of channel quality information.

Keeping the method's broad applicability in mind, FIG. 2 illustrates one embodiment of a method of generating channel quality information, wherein it should be understood that at least some of the illustrated processing steps may be performed in other than the illustrated order. Further, although illustrated as serial processing, actual implementation of the method may involve concurrent, parallel processing, as part of ongoing communication operations. Also, it should be understood that the illustrated processing may be implemented in the base station 10, the wireless communication device 12, or in some combination thereof.

Processing "begins" with a determination of whether to operate in a first mode of generating channel quality information (Step 100). If the first mode is selected, processing continues with generating channel quality information according to a first algorithm that does not depend on channel estimates (Step 102). Conversely, if the first mode is not selected, i.e., the second mode of operation is selected, processing continues with generating channel quality information according to a second algorithm that depends on channel estimates (Step 104).

In at least one embodiment taught herein, the first mode of generating channel quality information is used during fast fading conditions, or whenever conditions are such that the short-term channel estimates obtained by the wireless communication device 12 are "unreliable." The second mode of generating channel quality information is used during slow fading conditions, or, more generally, whenever the channel estimates are reliable. In other words, channel quality information is generated as a function of long-term propagation channel characteristics when short-term estimates of the channel are not reliable. Conversely, channel quality information is generated as a function of the short-term propagation channel characteristics when the channel estimates are reliable.

It should be understood that various methods of assessing channel estimation reliability are contemplated herein, and it should be understood that conditions deemed to give rise to unreliable channel estimations in one application may not be considered as such in another application. For example, the reliability of a short-term channel estimate may be viewed in terms of fading speed versus link adaptation control lag. That is, channel estimates may be deemed more or less reliable in dependence on how quickly channel conditions change relative to the transmit link adaptations being made. In some embodiments, the link adaptation lag—i.e., the time between a reported channel quality metric and the corresponding transmit link adjustment—may be used to influence whether, or to what extent, short-term propagation channel conditions are considered in generating channel quality information.

Figure 3:
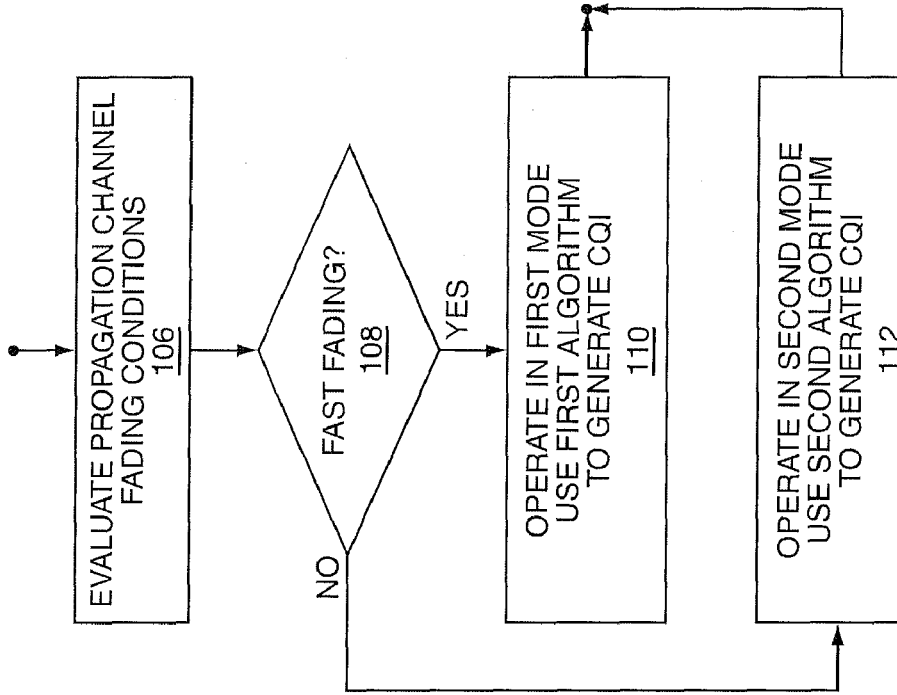
FIG. 3 is a logic flow diagram for one embodiment of selecting operating modes in the context of FIG. 2.

With such variations in mind, FIG. 3 illustrates one embodiment of processing logic for determining whether to operate in the first or second modes of FIG. 2. Modal selection processing "begins" with evaluating propagation channel fading conditions (Step 106). As will be detailed later herein, the evaluation may comprise assessing the reliability of the channel estimates to determine whether fast-fading conditions apply. In other embodiments, fast-fading may be recognized by evaluating mobility, such as by evaluating the Doppler frequency shift of transmissions on the downlink and/or uplink channels between the base station 10 and the wireless communication device 12. Of course, other indicators bearing on the reliability of short-term channel estimates may be used. For example, certain service areas may make channel estimates inherently suspect, such as radio sectors in downtown or urban areas.

If fast fading conditions apply (Step 108), channel quality generation operates in the first mode, wherein channel quality information is generated in a manner that is not dependent on channel estimates (Step 110). Conversely, if fast fading conditions do not apply, channel quality information is generated in a manner that is dependent on channel estimates (Step 112).

Figure 4:
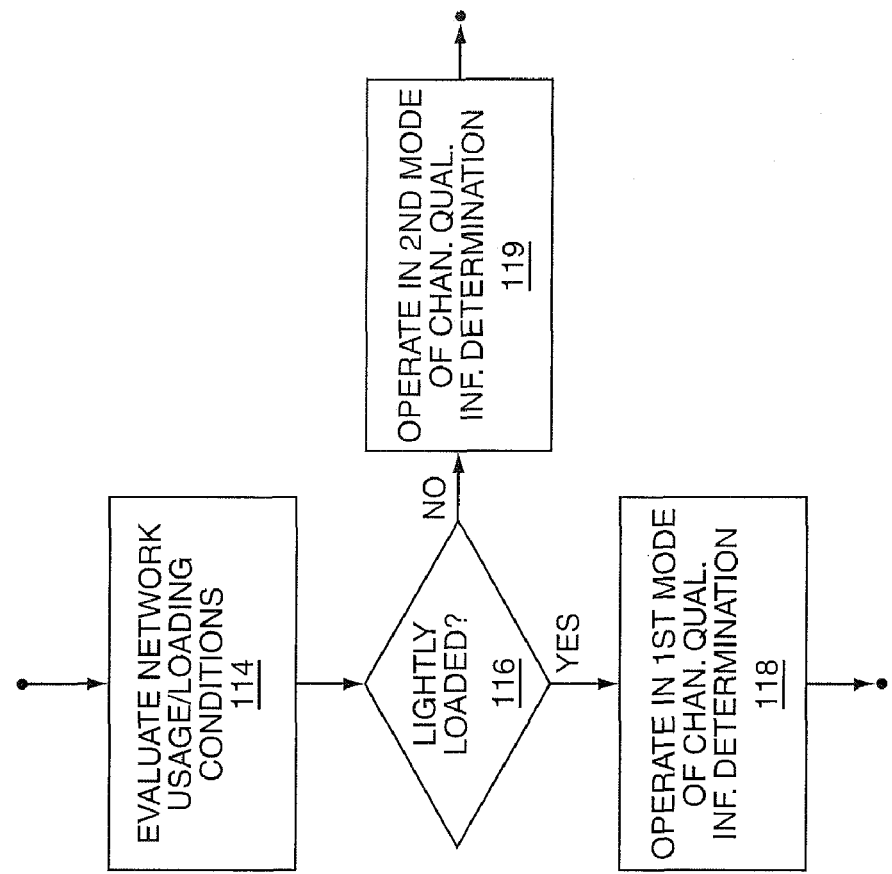
FIG. 4 is a logic flow diagram for another embodiment of selecting operating modes in the context of FIG. 2.

FIG. 4 illustrates another embodiment of processing logic for determining whether to operate in the first or second modes of FIG. 2. Modal selection processing "begins" with evaluating the network usage or load conditions (Step 114). In a lightly loaded wireless network, the reliability of the channel estimates and the derived channel quality information can be compromised even if the propagation channel fading conditions change slowly or remain static. For example, because of bursty and fast varying of inter-cell interference that is characteristic of a lightly load network, the channel quality and hence the supportable data rate realized during actual transmission of the data can be rather different than what was measured prior to the transmission.

Thus, if the network is lightly loaded (Step 116), it can be advantageous to select the first mode of determining channel quality information (Step 118). Conversely, if the network is more heavily loaded, or the loading is otherwise more stable, channel quality information can be determined according to the second mode of operation (Step 119). The selection of which operating mode to use for channel quality information determination can be evaluated and/or applied to individual wireless communication devices 12, or can be applied to sets or subsets of wireless communication devices 12, within a given sector or cell of the network. For example, the first mode may be used for some wireless communication devices 12, while the second mode may be used for others. The determination of which mode to use may be set according to the service needs of individual wireless communication devices 12, for example.

Note that this modal selection can be implemented in ways that are non-transparent or transparent to the wireless communication devices 12. In one embodiment, a base station 10 in the wireless communication network can instruct one or more devices in a plurality of wireless communication devices 12 to feed back information that is compatible with the preferred operating mode. Alternatively, based on the network load conditions, the base station 10 can receive information supporting the second mode of operation, but can choose to ignore all or some of that information, in favor of operating in the first mode. In other words, the base station 10 may choose not to use all of the feedback that it receives.

In some circumstances, the radio resource cost required to support operation in the second mode is higher than that for operation in the first mode. For instance, to support operation in the second mode, feedback generally has to be sent by the wireless communication devices 12 more frequently than is required for operation in the first mode, to reflect changing propagation channel conditions. The amount of feedback also could be larger to describe the propagation channel conditions in sufficient detail for operation in the second mode. The strain on the feedback channel is further exacerbated by the fact that a plurality of wireless communication devices 12 simultaneously transmits feedback information to the network. Thus, the first mode of operation may be preferred even when operation in the second mode is viable, simply based on propagation channel condition considerations.

In one or more embodiments, channel quality information determination considers the potentially higher radio resource costs on the feedback channel associated with operation in the second mode. More particularly, the second mode of operation can be reserved for contractually privileged devices or services. The privilege level of a given communication device 12 can be referenced from a database with the identification number of the device. Channel quality information can be determined according to operation in the second mode for devices with higher privilege. The contractual requirement of a service can also be a factor in considering the appropriate operation mode. For instance, for services with stringent delay or jitter requirements such as packet voice services, the quality of service can be more easily maintained if channel quality information is determined according to operation in the second mode.

Deciding whether to determine channel quality information according to the first or second modes of operation also may be adapted to transmission schemes that consist of separable components. Non-limiting examples of these types of transmission schemes include multi-carrier CDMA and orthogonal frequency division multiplexing (OFDM) transmission. To support operation in the second mode, the amount of feedback can scale directly with the number of separable components, e.g., four feedback values for four-carrier CDMA or eighty values for OFDM with eighty frequency resource units. For large packets or data units that would occupy entire or large portions of the components, the relative benefits of operating in the second mode instead of the first mode can be significantly smaller than for small packets or data units that would occupy small portions of the components. To conserve radio resources, it is therefore advantageous to include packet or data unit lengths as a factor in operating mode selection.

Such operation is, in one or more embodiments, supported by the use of receiver performance data that characterizes the performance of the wireless communication device's receiver type over a range of propagation channel conditions, such that the performance data indicates the expected performance of the receiver over a range of propagation channel conditions, and for particularized propagation channel conditions. Determining channel propagation conditions for channel quality information determination—e.g., for supportable rate computation—may be required for operation in the first and/or second modes of operation. For the first operating mode, long-term channel propagation conditions are determined and, in one or more embodiments, the propagation channel conditions include one or more of the following quantities: a characterization of the fading speed of the channel (for example, based on the estimated Doppler frequency, known mobile speed, rate of negative acknowledgements—i.e. NACK rate, . . . ); and an estimate of the power delay profile (PDP) of the propagation channel associated with the wireless communication device 12, assuming that the PDP does not change quickly over time.

In one or more embodiments, the estimation of long-term propagation channel conditions is used for any one or more of the following processing actions: construction of a CDF of the achievable (supportable) data rates; selection of an achievable data rate curve CDF from a table of CDF curves that most closely matches the estimated long-term propagation channel conditions. Thus, it should be understood that in one or more embodiments, CDF curves may be predefined. In such embodiments, the received signal quality and/or long-term characterization of the propagation channel associated with the wireless communication device 12 can be used to select a point or range along a predefined CDF curve to identify channel quality information for the wireless communication device 12—e.g., to identify an achievable data rate. In one or more other embodiments, the long-term propagation channel conditions as estimated are used to partially or wholly construct one or more CDF curves, which can then be used to identify achievable data rates, for example, as a function of measured signal quality at the wireless communication device 12.

In more detail, for purposes of CDF curve construction, the PDP is considered a known quantity, and estimates of the delay tap (channel) coefficient values can be generated and used to further determine the propagation channel realization for the given PDP. At least one embodiment estimates propagation channel coefficients based on pilot or other measurements, to support characterization of long-term propagation channel conditions. It should be understood that traditional techniques for propagation channel estimation may be used as needed or desired. Note that the estimation of channel coefficients represents a longer-term estimate, rather than the short-term (instantaneous) estimates that are generally used in the second mode of operation.

Figure 5:
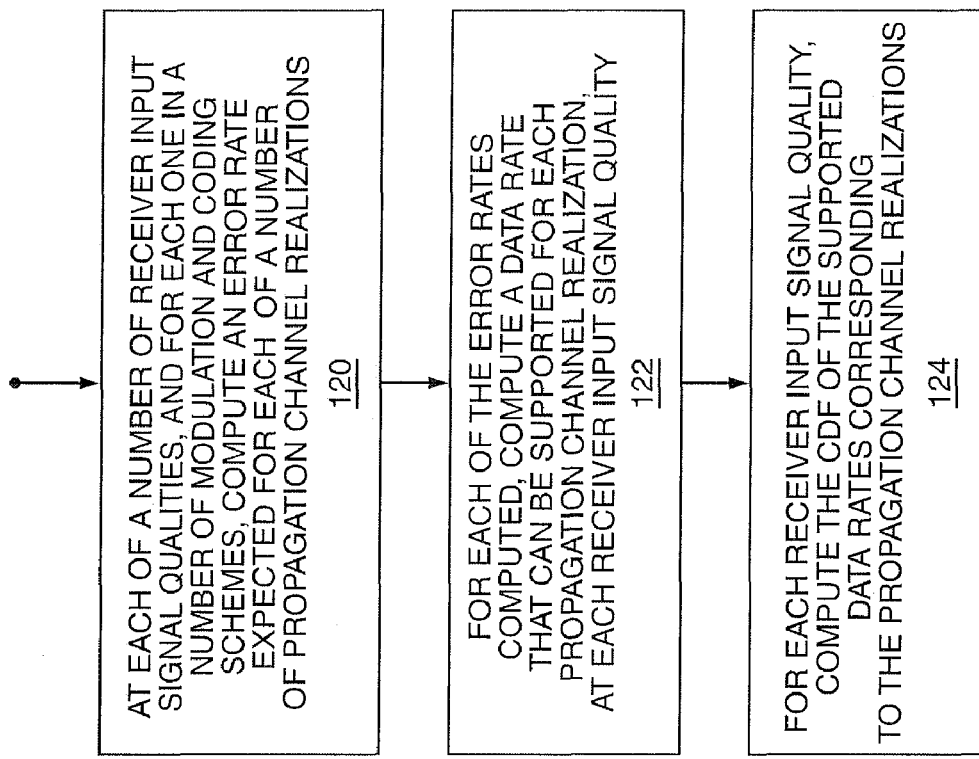
FIG. 5 is a logic flow diagram for one embodiment of a receiver performance characterization method.

In any case, it should be understood that, however they are constructed, the CDF curves characterize the (expected) performance of a particular receiver type, or types. FIG. 5 illustrates one method of characterizing receiver performance based on CDF curves, but it should be understood that other methodology may be used to characterize receiver performance for long-term and short-term propagation channel conditions.

In more detail, FIG. 5 illustrates an embodiment of a receiver performance characterization method that may be performed using empirical testing, software simulation, dynamic measurements, or any combination thereof. Because different receiver types offer different levels of performance, such characterization is done for the particular receiver type associated with the wireless communication device 12. (If the channel quality information is generated by the wireless communication device 12, the receiver performance data can be stored in the wireless communication device 12. If the channel quality information is generated in the base station 10, the base station 10 may store characterization data for different types of receivers, and use the appropriate sets of receiver performance data for different wireless communication devices.)

In any case, processing begins by computing an expected error rate for each one in a number of receiver input signal quality values, for each one in a number of modulation and coding schemes, and for each one in a number of propagation channel realizations (Step 120). Error rate may be expressed, for example, as Bit Error Rate (BER), Block Error Rate (BLER), Frame Error Rate (FER), etc., and the particular manner in which error rate is expressed may be based on the type of data transmissions involved.

As used herein, unless otherwise noted, the term "receiver input signal quality" denotes the ratio of total received signal energy per chip, $E_T$, over the noise plus interference, $N_o$. Measurements of receiver input signal quality represent the "raw" input signal quality for the receiver embodied within the wireless communication device 12, and does not depend on the receiver's interference suppression and signal gain performance, and thus does not depend on the accuracy of short-term propagation channel estimates. Moreover, receiver input signal quality measurements are the same for simple and complex receiver structures, e.g., the same whether the device's receiver is a simple linear receiver, or a complex non-linear receiver.

Further, as used herein, the term "propagation channel realization" represents a particular combination of propagation channel tap weights. For example, a plurality of three-tap characterizations of the propagation channel comprises different combinations of three complex tap coefficients, corresponding to different propagation channel conditions. The different propagation channel realizations may be based on a fixed Power Delay Profile (PDP). Alternatively, a given fast fading realization may be used for different PDPs, and different CDFs may be used for the different PDPs.

In any case, each propagation channel realization may be understood as representing a particular hypothesis of actual propagation channel conditions for the transmit link between the base station 10 and the wireless communication device 12. For the same input signal quality, the wireless communication device 12 will exhibit different output signal quality for different channel realizations.

For each receiver input signal quality and each modulation and coding scheme, receiver performance characterization processing continues by, for each of the error rates computed, computing the data rate (R) that can be achieved (supported) for each propagation channel realization (Step 122). The achievable data rate, also referred to as the supported data rate, represents the data rate (R) that can be used for transmitting to the wireless communication device 12 while still meeting a defined performance requirement, e.g., a BLER target. For example, if the computed error rate is less than the target BLER, i.e., BLER<BLER(target), the data rate ($R_{mcs}$) corresponding the modulation and coding scheme can be the supported data rate ($R=R_{mcs}$), otherwise the supported data rate can be zero (R=0). If ARQ is used, then the supported data rate (R) can be calculated as $R=R_{mcs}(1-BLER)$, where $R_{mcs}$ is the data rate corresponding the modulation and coding scheme and BLER is the computed error rate. If HARQ is used, then the supported data rate can be calculated as $R_{mcs}/(1+BLER)$.

Processing continues by, for each receiver input signal quality, computing the cumulative distribution function (CDF) of the supported data rates corresponding to the propagation channel realizations (Step 124). Note that the generation of CDF curves can be a one-time process, or can be wholly or partially a dynamic process. For example, as was noted earlier, ongoing estimation of one or more parameters bearing on the longer-term propagation channel conditions for the wireless communication device 12. Again, such parameters can include, but are not limited to, any one or more of the PDP, estimated channel coefficients, current data service type and/or data characteristics such as packet size, mobility/rate-of-travel estimates, etc.

Figure 6:
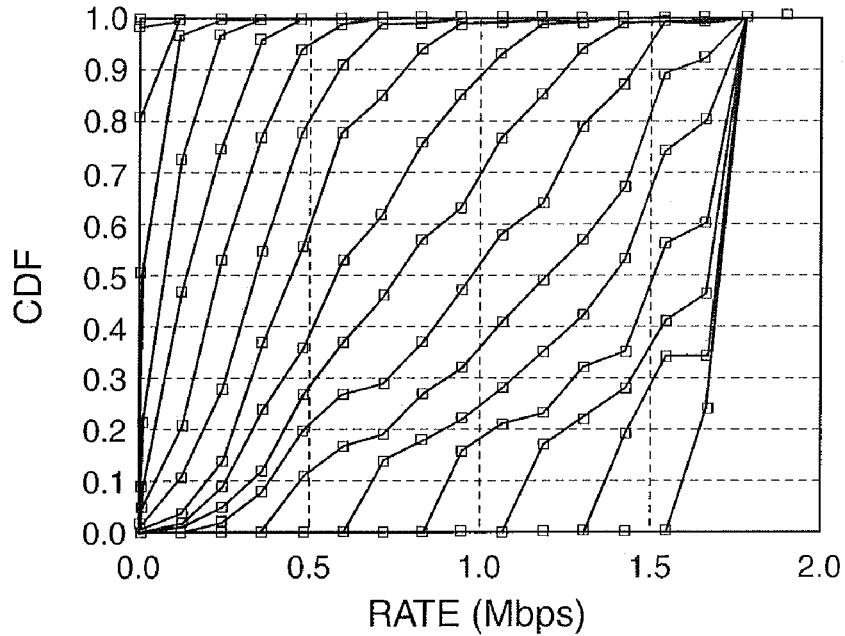
FIGS. 6 and 7 are graphs depicting receiver performance characterizations obtained by the receiver performance characterization method of FIG. 5, for different types of wireless communication device receivers.
Figure 7:
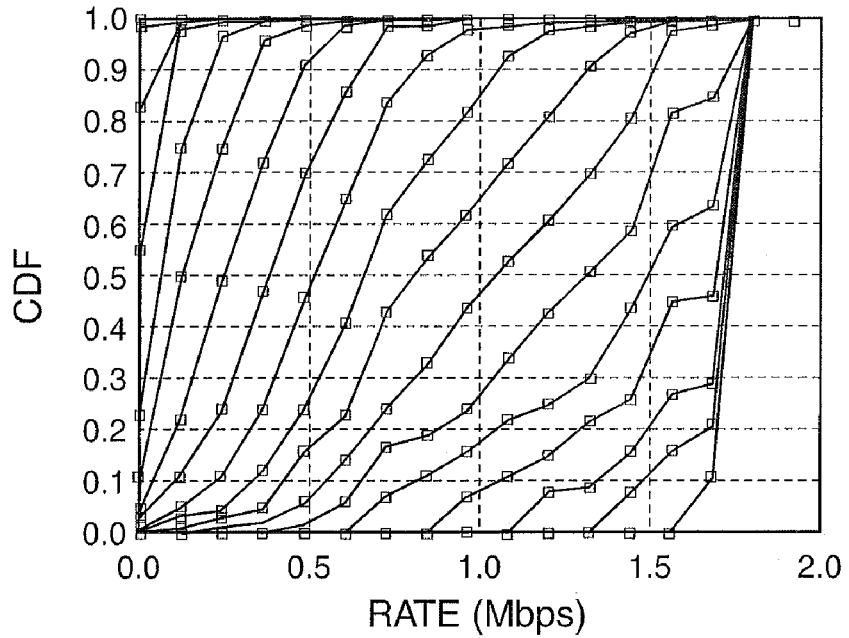

FIG. 6 graphically depicts receiver performance data generated according to the method of FIG. 5 for a Minimum Mean Square Error (MMSE) receiver type. More particularly, FIG. 6 graphs receiver input signal quality (SNR) curves stepped from −22 dB to +12 dB in 2 dB increments over defined data rate points, according to the CDFs of the supported data rates for the hypothesized set of propagation channel realizations. The leftmost curve corresponds to input SNR of −22 dB, whereas the rightmost curve corresponds to input SNR of +12 dB. FIG. 7 depicts similar performance characterization data for a Joint Detection (JD) receiver architecture, and it should be understood that the particular receiver performance data used for the wireless communication device 12 would be matched to its particular receiver type. (Further, because some types of receivers have different reception modes that yield different performance characteristics, different receiver performance data can be used in each such mode.)

In determining channel quality information using the performance curves of FIG. 6, for example, consider the case of higher rates of travel, where the channel fading conditions become more temporally uncorrelated between the measurement time at which propagation channel conditions are estimated, and the transmit time at which transmit link adaptations based on those channel estimates are performed. If the channel conditions are changing more rapidly than link adaptation control can keep up with, link adaptation—e.g., transmit data rate selection—should be based on the statistical propagation characteristics determined by the path gain and shadowing, rather than based on the channel estimates.

Given signal quality measured by the wireless communication device 12, the transmit data rate can be selected from the corresponding signal quality curve in the receiver performance data, according to a desired CDF level. For example, choosing the tenth percentile for the appropriate SNR curve corresponds to the data rate achievable for ninety-percent of the hypothesized propagation channel realizations. The particular value to choose generally depends on the particular performance requirements of the system, such as determined by a defined performance requirement, like maximum tolerable BLER. In one or more embodiments, the signal quality represents a long-term signal quality—average input SNR—as measured by the wireless communication device, or as averaged by the network. In other embodiments, such as where channel estimates are reliable, the instantaneous or short-term receiver input signal quality may be used.

In either case, the above approach effectively quantizes the rate values in the performance characterization graph to the rates represented by quantized input signal quality measurements, which is sufficient for slow link adaptation in a rapidly varying channel. That is, for fast fading conditions, the channel quality information may be generated as data rate selections based on selecting an SNR curve from the graph corresponding to long-term measured signal quality at the wireless communication device 12, and then identifying the data rate that is achievable at a desired probability for the defined performance requirement, e.g., for a defined BLER limit. Effectively, the method amounts to generating channel quality information as a function of long-term propagation channel characteristics based on mapping a receiver input signal quality measurement to a data rate selection that is achievable at a desired probability over a range of short-term propagation channel characteristics.

As the channel becomes more reliable, for example, when vehicle speeds become slower or actual input SNR at the receiver becomes larger due to improved path gain, the channel quality information generation process can be transitioned to a mode where more refined information is generated, i.e., a mode where the short-term propagation channel conditions prevailing at the wireless communication device 12 are explicitly considered. The same performance characterization data that was used for slow adaptation during fast fading may be used for fast adaptation during slow fading. In other words, the same receiver performance curves can be used for slow and fast link adaptation in a hierarchical manner. That is, channel quality metrics can be used to characterize the long-term properties of the channel, which can then be characterized further for fast link adaptation when the channel becomes more reliable.

One method for accomplishing the above operation is to quantize the channel state values for each input signal quality (SNR) and store the quantized values in a codebook. For specific input SNR and channel estimates obtained at the wireless communication device 12, the quantized values can be looked up in the codebook, and the corresponding data rate selected for channel quality information reporting.

Figure 8:
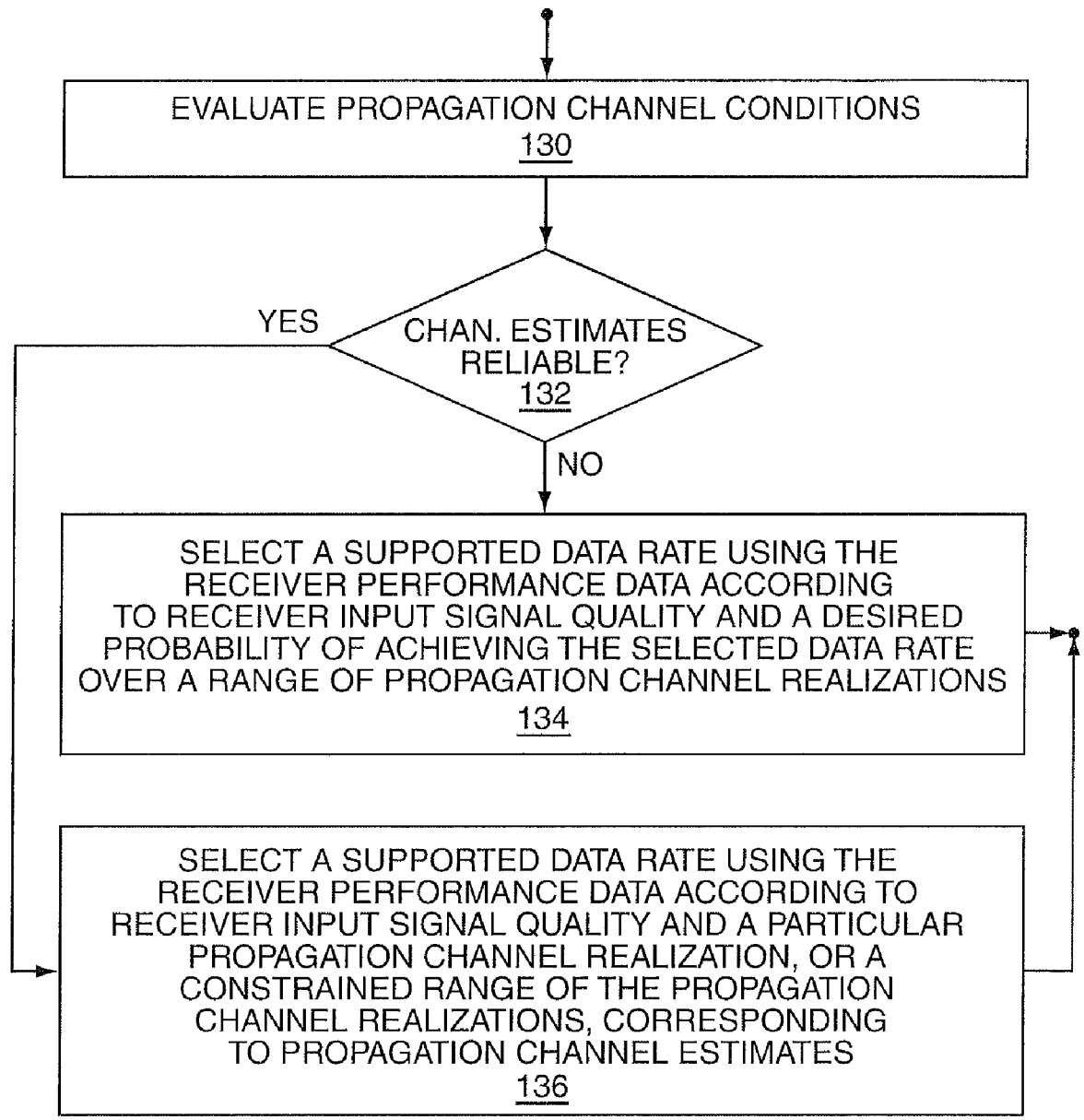
FIG. 8 is a logic flow diagram for one embodiment of modally generating channel quality information using receiver performance data.

FIG. 8 illustrates one embodiment of hierarchical channel quality information generation, wherein the channel quality information is generated in terms of data rate reports. Such processing may be performed at the wireless communication device 12, at the base station 10, or cooperatively. In any case, processing begins with evaluation of the propagation channel conditions (Step 130). Evaluation may comprise evaluating short-term propagation channel estimates being generated by the wireless communication device 12 as a means of determining whether the estimates are reliable, or may comprise checking Doppler shifts, etc.

If the channel estimates are not reliable (Step 132), a supported data rate is selected using receiver performance data, such as illustrated in FIGS. 6 and 7. More particularly, if the channel estimates are not reliable, the measured receiver input signal quality can be mapped to one of the quantized SNR curves, and a corresponding supported data rate can be identified according to the desired probability of achieving that rate over the range of propagation channel realizations used to generate the performance data (Step 134). A tenth percentile selection means that ninety-percent of the hypothesized propagation channel realizations will support the selected data rate at the desired error rate performance.

As such, if the channel estimates are not reliable, the transmit data rate is selected probabilistically, rather than based on any specific consideration of the short-term propagation channel conditions existent at the wireless communication device 12. Further, in cases where the channel estimates are not reliable, the receiver input signal quality used to select the appropriate quantized SNR curve may be a long-term (average) receiver input signal quality. Averaging may be done at the wireless communication device 12, or instantaneous values reported by the wireless communication device 12 may be averaged by the network.

On the other hand, if the channel estimates are reliable (Step 132), the measured receiver input signal quality may represent a shorter term, e.g., instantaneous, measurement. Of course, averaged values may still be used. In either case, with the availability of reliable channel estimates, the receiver input signal quality can be mapped to one of the quantized SNR curves and a particular propagation channel realization, or a constrained range of propagation channel realizations, corresponding to the channel estimates (Step 136). In one variation of this approach, different SNR/CDF curves can be stored for long-term and short-term SNR measurements, with the different SNR curves reflecting different probabilistic characteristics. Then, in operation, the set of curves to be used is selected depending on whether long-term or short-term SNR values are being used, which may switch as a function of channel estimate reliability.

Figure 9:
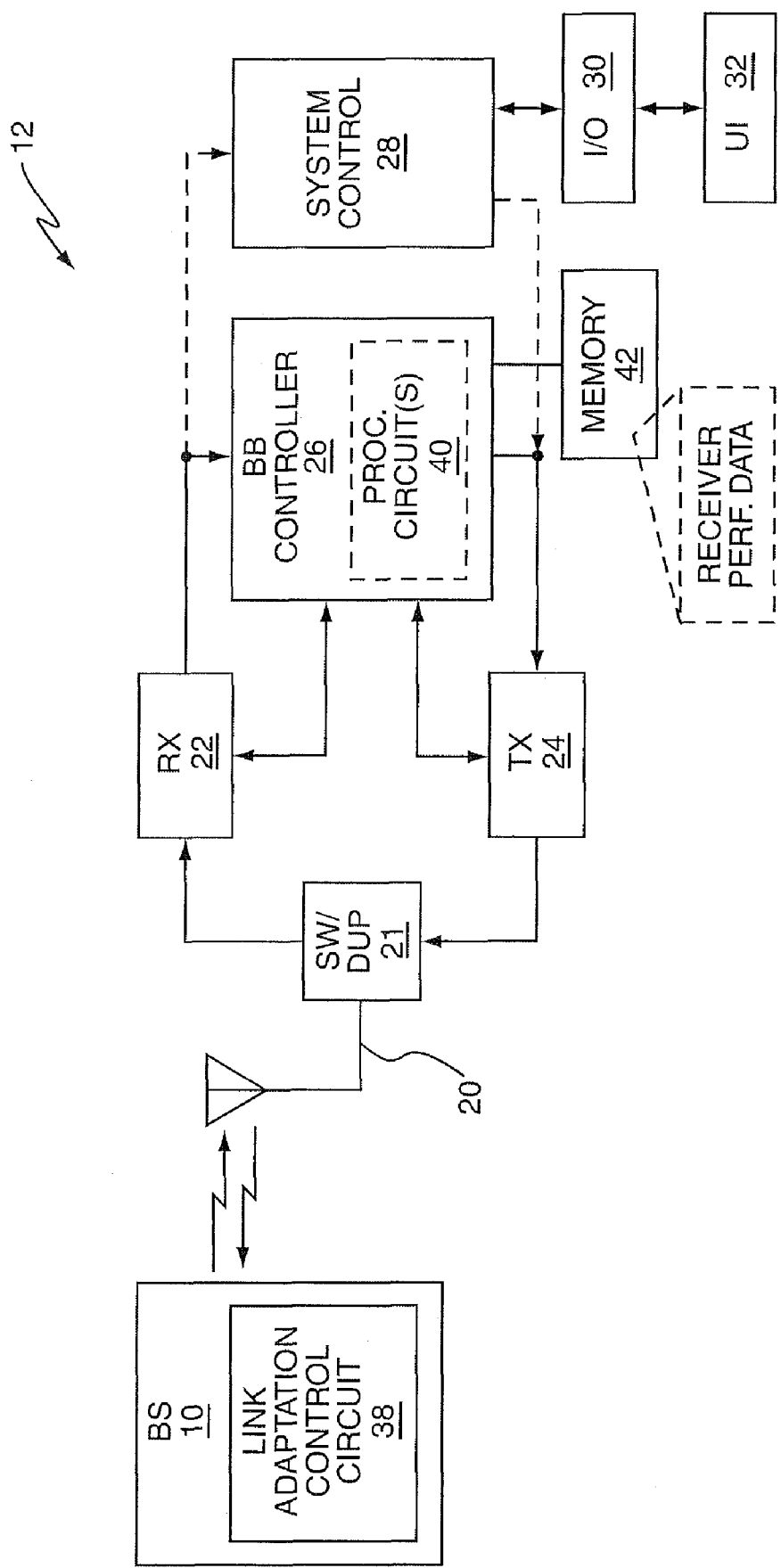
FIG. 9 is a block diagram for one embodiment of a wireless communication device that is configured to generate channel quality information.

This hierarchical approach to channel quality information generation can be implemented in the wireless communication device 12, such as by including appropriately configured processing circuits in the device 12, along with storing appropriate receiver performance data. FIG. 9 illustrates one embodiment of the wireless communication device 12, configured for carrying out a method of channel quality information generation using receiver performance data. The illustrated embodiment comprises a receive/transmit antenna 20, a switch/duplexer 21, a receiver front-end 22, a transmitter 24, a baseband (BB) controller 26, a system controller 28, input/output (I/O) interface circuits 30, and a user interface (UI) 32.

Of particular interest regarding channel quality information generation, the baseband controller 26 includes one or more processing circuits 40, which are configured for channel quality information generation, and which have access, direct or indirect, to a memory 42 storing receiver performance data. The stored data may comprise a data structure representing quantized SNR curves and corresponding CDFs of supported rates for a plurality of propagation channel realizations, e.g., a set of 1000 channel realizations, such as illustrated in FIG. 6 or 7. However, at least some of the performance data may be obtained using curve-fitting calculations—e.g., polynomials—and it should be understood that various methods of storing and representing receiver performance data are contemplated herein.

In operation according to one embodiment, the wireless communication device 12 maintains a long-term estimate of receiver input signal quality—average SNR—and further maintains short-term (instantaneous) propagation channel estimates. If the propagation channel estimates are not reliable, the wireless communication device 12 operates in a first mode of channel quality information generation. In the first mode, the wireless communication device 12 maps measured, average receiver input signal quality to the closest corresponding receiver input signal quality represented in the receiver performance data, and then uses that SNR curve to identify the data rate that can be supported at a desired probability over a range of propagation channel realizations. As such, the wireless communication device 12 returns channel quality information to the base station 10 in the form of updated transmit data rate selections that are identified probabilistically, without regard to the actual channel estimates. A transmit link adaptation control circuit 38 in the base station 10 uses the reported data rate selections to adjust the transmit data rate used to send traffic to the wireless communication device 12.

If the propagation channel estimates are reliable, the wireless communication device 12 operates in a second mode. In the second mode, the wireless communication device 12 selects the SNR value in the receiver performance data most closely corresponding to the average receiver input signal quality as measured by the wireless communication device 12, and further selects a propagation channel realization, or a constrained range of propagation channel realizations, in the receiver performance data that most closely corresponds with current channel estimates. The wireless communication device 12 thus uses the receiver performance data to identify the data rates that can be supported for measured receiver input signal quality and corresponding channel estimates, and reports the identified data rate selections to the base station 10.

In both the first and second modes, the base station 10 receives channel quality information in the form of data rate selections, and the base station 10 performs corresponding transmit data rate adjustments for forward link transmissions to the wireless communication device 12. As such, whether the channel quality information is being generated in consideration of current channel estimates may be transparent to the base station 10. That is, from the base station's perspective, link adaptation may transparently shift between the first and second modes, without need for explicit signaling. In some embodiments, however, the mode of channel quality information generation may be signaled, or otherwise indicated. For example, the rate at which channel quality information is reported to the base station 10 may change in dependence on whether channel quality information is being generated in the first or second modes.

FIGS. 10 and 11 illustrate embodiments of processing circuits that may be included in, or associated with, the baseband controller 40 of the wireless communication device 12, and used to implement generation of channel quality information in the first and second modes. FIG. 10, in particular, illustrates the processing circuit(s) 40 as comprising a channel quality information generation circuit 44, which generates channel quality information, e.g., rate selection data, in first and second modes. The circuit 44 may be configured to provide an indication of the type of channel quality information being generated, i.e., it may indicate the mode that it is operating in.

The processing circuit(s) 40 may further include, or may further be associated with, a channel estimate reliability evaluation circuit 46 and a channel estimation circuit 48. The channel estimate reliability evaluation circuit 46 is configured to estimate the reliability of the channel estimates being generated by the channel estimation circuit 48, which generates instantaneous propagation channel estimates based on the received signal and pilot information. The channel estimate reliability evaluation circuit 46 may receive, among other things, the channel estimates from the channel estimation circuit 48 and/or the pilot values. Operation may be switched between the first and second modes based on the reliability indicator output by the reliability evaluation circuit 46.

Note, too, that the channel quality information generation circuit 44 may be configured to perform the receiver input signal quality measurements, i.e., the $E_T/N_o$ calculations, or another functional circuit may be included for that purpose in the processing circuit(s) 40. On that point, it should be understood that illustrations of the processing circuit(s) 40 may represent functional rather than physical circuit elements. For example, the processing circuit(s) 40 may comprise all or a portion of a microprocessor-based circuit, an FPGA, ASIC, etc.

Continuing with function circuit descriptions, FIG. 11 illustrates one embodiment of the channel quality information generation circuit 44 that is depicted in FIG. 10. One sees that the reliability indicator drives a mode select circuit 50, which selects the source circuit for the channel quality information being output. If the reliability indicator indicates that the channel estimates are not reliable, the mode select circuit 50 selects a long-term channel quality information estimation circuit 52 as the source circuit. The long-term channel quality information estimation circuit 52 selects supported data rates using the receiver performance data based on long-term estimates of receiver input signal quality and desired CDF probabilities.

Conversely, if the reliability indicator indicates that the channel estimates are reliable, the mode select circuit 50 selects an instantaneous (short-term) channel quality information estimation circuit 54 as the source circuit. In one embodiment, the instantaneous channel quality information estimation circuit 54 selects supported data rates using the receiver performance data based on long-term estimates of receiver input signal quality and the channel estimates. In another embodiment, instantaneous channel quality information is generated by calculating receiver output signal quality. In such embodiments, channel quality information is determined in the first mode using receiver input signal quality, and determined in the second mode using receiver output signal quality.

In any case, it should be understood that the base station 10 can be configured to generate channel quality information according to any of the above embodiments, based on the wireless communication device feeding back channel quality measurements. For example, FIG. 12 illustrates a channel quality information generation circuit 60 and a memory 62, which may be included in the base station 10. The memory 62 stores receiver performance data for one or more receiver types, with at least one set of receiver performance data matching the type of receiver implemented in the wireless communication device 12.

More generally, in such embodiments, the base station 10 comprises one or more processing circuits configured to determine channel quality information for a transmit propagation channel corresponding to the wireless communication device 12. Such generation may be based on, in a first mode, generating channel quality information according to a first algorithm that does not depend on channel estimates for the wireless communication device 12, and in a second mode, generating channel quality information according to a second algorithm that depends on the channel estimates.

In one embodiment, in the first mode, the base station 10 receives at least receiver input signal quality information for the wireless communication device 12. As described, the first algorithm may comprise mapping receiver input signal quality to a data rate that is achievable at a desired probability over a range of propagation channel realizations. For the second mode of operation, the base station 10 receives receiver input signal quality information and propagation channel information from the wireless communication device 12—e.g., quantized long-term SNR values and quantized short-term propagation channel estimates.

If the base station 10 stores code books of SNR values and propagation channel realizations, the wireless communication device 12 need only return code book indices corresponding to its measurements. In any case, the second algorithm may comprise mapping receiver input signal quality to a data rate that is achievable for a particular propagation channel realization, or for a constrained range of propagation channel realizations, corresponding to the propagation channel estimates.

As such, the base station 10 can be configured to select operation in the first mode if it receives receiver input signal quality information for the wireless communication device 12 without receiving corresponding channel estimates. Alternatively, the wireless communication device 12 can be configured always to report channel estimates and signal quality, and the base station 10 can be configured to select operation in the first or second modes based on evaluating the reliability of the channel estimates. In at least one embodiment, the base station 10 selects the mode based on determining whether the wireless communication device 12 is operating in fast fading conditions. If the wireless communication device 12 is operating in fast fading conditions, the base station 10 operates in the first mode. If the wireless communication device 12 is not operating in fast fading conditions, the base station 10 operates in the second mode. Of course, it should be understood that first and second modes of operation may be managed independently for individual ones in a plurality of wireless communication devices being supported by the base station 10.

Further, and more generally, it should be understood that channel quality information generation as taught in one or more embodiments described herein uses receiver performance data to determine channel quality information metrics, such as supported data rates, based on using receiver performance data. The receiver performance data characterizes supported data rates in terms of propagation channel realizations, for each in a plurality of quantized receiver input signal qualities. In a first mode of operation, the data rate that can be achieved at a desired probability over a range of propagation channel conditions, e.g., all hypothesized propagation channel realizations, are selected for the receiver input signal quality value that corresponds to measurements obtained by the wireless communication device 12. As such, the data rate is not set in consideration of the instantaneous channel conditions prevailing at the wireless communication device 12, but rather set probabilistically, in consideration of the long-term channel conditions. As such, the first mode of operation can be selected whenever reliable channel estimates are not available.

In a second mode of operation, where reliable channel estimates are available, data rates are selected using receiver input signal qualities and propagation channel realizations corresponding to measurements obtained at the wireless communication device 12. In other words, short-term propagation channel conditions are considered when the estimates of those conditions are reliable. In this regard, the same receiver performance data can be used to generate channel quality information metrics with or without using current propagation channel estimates. As such, it is convenient to modify transmit link adaptation to switch between slow link adaptation—i.e., the first mode of operation—and fast link adaptation—i.e., the second mode of operation.

Of course, the present invention is not limited by the foregoing discussion, nor is it limited by the accompanying drawings. Indeed, the present invention is limited only by the following claims, and their legal equivalents.

What is claimed is:

1. A method of characterizing the performance of a type of wireless communication receiver, said method comprising:
   for each of a number of receiver input signal qualities and each of a number of modulation and coding schemes, computing an error rate expected for each of a number of propagation channel realizations;
   for each of said receiver input signal qualities and each of said modulation and coding schemes, computing a data rate that can be supported for each propagation channel realization; and
   for each receiver input signal quality, computing the cumulative distribution function of the supported data rates corresponding to the propagation channel realizations and electronically storing the results as performance characterization data for said type of wireless communication receiver.

2. The method of claim 1, wherein computing a data rate that can be supported for each propagation channel realization comprises determining the data rate (R) that can be supported as a function of a data rate ($R_{mcs}$) corresponding to the modulation and coding scheme, and a Block Error Rate (BLER) expected for the propagation channel realization.

3. The method of claim 2, wherein determining the data rate (R) that can be supported as a function of a data rate ($R_{mcs}$) corresponding to the modulation and coding scheme, and a Block Error Rate (BLER) expected for the propagation channel realization comprises calculating R as $R=R_{mcs}(1-BLER)$.

4. The method of claim 2, wherein determining the data rate (R) that can be supported as a function of a data rate ($R_{mcs}$) corresponding to the modulation and coding scheme, and a Block Error Rate (BLER) expected for the propagation channel realization comprises calculating R as $R=R_{mcs}/(1+BLER)$.

5. The method of claim 1, wherein computing a data rate that can be supported for each propagation channel realization comprises determining the data rate (R) that can be supported as a function of a data rate ($R_{mcs}$) corresponding to the modulation and coding scheme, a Block Error Rate (BLER) expected for the propagation channel realization, and a target Block Error Rate (BLER(target)).

6. The method of claim 5, wherein determining the data rate (R) that can be supported as a function of a data rate ($R_{mcs}$) corresponding to the modulation and coding scheme, a Block Error Rate (BLER) expected for the propagation channel realization, and a target Block Error Rate (BLER(target)) comprises determining R as $R=R_{mcs}$ if BLER<BLER(target), and otherwise determining R as $R=0$.

* * * * *